May 8, 1951  R. A. MANK  2,551,958

TIRE CHAIN

Filed April 19, 1947

INVENTOR.
Raymond A. Mank
BY William B. Jaspert
Attorney.

Patented May 8, 1951

2,551,958

UNITED STATES PATENT OFFICE 2,551,958

TIRE CHAIN

Raymond A. Mank, Pittsburgh, Pa.

Application April 19, 1947, Serial No. 742,512

1 Claim. (Cl. 152—242)

This invention relates to composite non-skid chains for automobile tires, and the present application is a continuation-in-part of my application Serial No. 672,807, filed May 28, 1946, which has matured into Patent No. 2,444,573 on July 6, 1948, wherein is disclosed a composite tire chain having reinforced rubber side members of sufficient stiffness to be substantially self-sustaining to maintain a circular form having the usual cross links attached thereto.

In the aforementioned application the rubber side rims were provided with flexible steel cables embedded therein with eyelets for connecting the cross links. In accordance with the present invention the steel cable is eliminated and the rubber or other flexible self-sustaining side members are constructed of reinforced material to which is attached the eyelets or other attaching means for securing the cross links.

Figure 1:
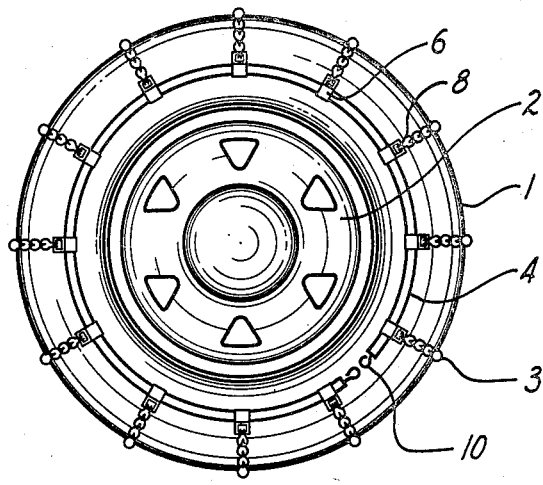
Figure 2:
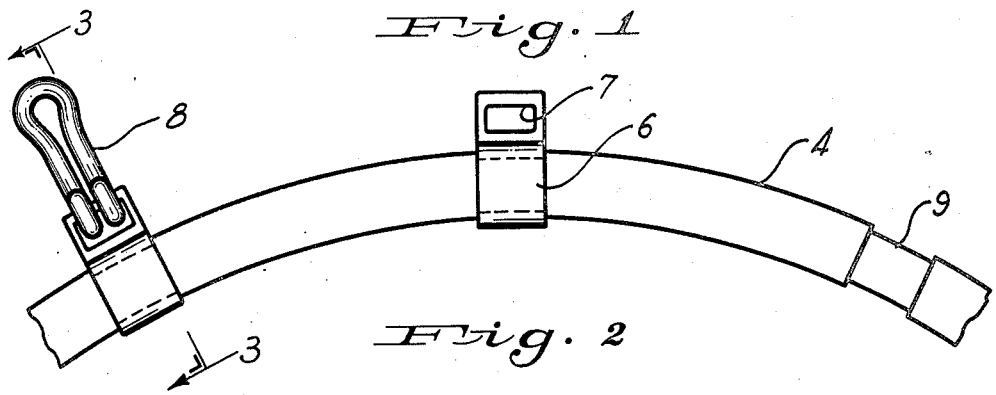
Figure 3:
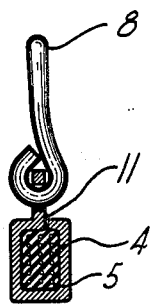

The invention will become more apparent from a consideration of the accompanying drawing constituting a part hereof, in which like reference characters designate like parts, and in which Fig. 1 is a side elevational view of an automobile wheel and non-skid tire chain embodying the principles of this invention;

Fig. 2 a side elevational view of a portion of the side members of the composite chain; and Fig. 3 a cross sectional view taken along the line 3—3, Fig. 2.

In the drawing the numeral 1 designates a conventional rubber tire on an automobile wheel 2 having the conventional cross link non-skid chain 3 mounted thereon by means of annular side members 4 which are preferably flexible and constructed of a resilient material suitably reinforced to be self-sustaining; that is to say, to retain the annular form whether mounted as shown in Fig. 1 or in its collapsed position.

As shown in Fig. 3, the side rim 4 may be a composite rubber having fabric and metal reinforcing 5 therein to make it stiff whereby it retains the annular form as shown in Fig. 1 and which contributes the desired physical properties such as strength for supporting the cross links 3.

The cross links are attached to the side members 4 by straps 6 having windows or eyes 7 for receiving the ends 8 of the cross links and the strap 6 may be clamped in recesses 9 mounted or otherwise formed in the side rims 4 so as to maintain the desired spacing of the cross links annularly around the periphery of a wheel. As shown in Fig. 1, the side rims 4 are provided with end connections 10 whereby they may be joined to secure the tire chain to the wheel 1.

As shown in Fig. 3, the cross link connector straps 6 are bent around the recess portion 9 to form a joint 11, Fig. 3. They may, however, be constructed of solid pieces which may be molded into the rubber instead of assembled as shown. Also the side rims 4 may be of other than rectangular cross sectional shape as shown in Fig. 3.

It is evident from the foregoing description of the invention that self-sustaining side rims of reinforced rubber having steel cross links are easily mounted on the wheels of automobiles because the mounting of the cross links on the self-sustaining annular shaped rubber rims effects a spacing of the cross links preliminarily to the mounting of the chain on the wheel, so that by slipping over the rear side rim 4 the chain is in proper position and by advancing or reversing the car the ends of the side members are brought to the position where they are accessible for fastening.

One of the outstanding features of the invention is the silencing of the chain since there is no slipping of the cross link with the side chains common to the conventional form of tire chain. By using a composite side rim like the member 4, the sound of the chain is almost entirely eliminated. Also, the composite rubber and cross link construction lends itself to replacement of the cross links when worn while retaining the more expensive side rim members for use over and over again. The economy thus effected more than offsets any additional cost of the composite side rim members.

Although one embodiment of the invention has been herein illustrated and described, it will be evident to those skilled in the art that various modifications may be made in the details of construction without departing from the principles herein set forth.

I claim:

A tire chain for vehicle wheels comprising a plurality of annular preformed molded rubber side rims having reinforcing therein, said rims having indents for receiving anchorages for the cross chains, anchorages mounted on the rim in said indents in angularly spaced relation and cross chains connected to one or more of said anchorages, said rims being split members and having fastening means at the ends for joining the ends of the rim when mounted on a vehicle wheel.

RAYMOND A. MANK.

REFERENCES CITED

The following references are of record in the file of this patent:

UNITED STATES PATENTS

| Number | Name | Date |
|---|---|---|
| 1,204,887 | La Fleur | Nov. 14, 1916 |
| 1,257,170 | Yoder | Feb. 19, 1918 |
| 1,301,988 | Weber | Apr. 29, 1919 |
| 1,311,048 | Cramer | July 22, 1919 |
| 1,963,939 | Dodge | June 19, 1934 |
| 2,110,226 | Hill | Mar. 8, 1938 |
| 2,444,573 | Mank | July 6, 1948 |